United States Patent
Ikeda et al.

(10) Patent No.: US 10,240,055 B2
(45) Date of Patent: *Mar. 26, 2019

(54) INK JET INK COMPOSITION AND PRODUCTION METHOD THEREOF

(71) Applicant: Seiko Epson Corporation, Tokyo (JP)

(72) Inventors: Yasunari Ikeda, Shiojiri (JP); Akihito Sao, Matsumoto (JP); Shinichi Naito, Chino (JP); Miho Nakamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/864,196

(22) Filed: Jan. 8, 2018

(65) Prior Publication Data

US 2018/0127611 A1 May 10, 2018

Related U.S. Application Data

(63) Continuation of application No. 14/673,260, filed on Mar. 30, 2015, now Pat. No. 9,868,872.

(30) Foreign Application Priority Data

Mar. 31, 2014 (JP) .................................. 2014-071238

(51) Int. Cl.
*C09D 11/38* (2014.01)
*C09D 11/326* (2014.01)
*C09D 11/328* (2014.01)

(52) U.S. Cl.
CPC ............ *C09D 11/38* (2013.01); *C09D 11/326* (2013.01); *C09D 11/328* (2013.01)

(58) Field of Classification Search
CPC ...... C09D 11/38; C09D 11/326; C09D 11/328
USPC ................... 106/31.32, 31.27, 31, 59, 31.59
See application file for complete search history.

(56) References Cited

U.S. PATENT DOCUMENTS

| | | |
|---|---|---|
| 4,849,773 A | 7/1989 | Owatari |
| 9,399,718 B2 | 7/2016 | Ikeda et al. |
| 9,534,128 B2 | 1/2017 | Oguchi et al. |
| 9,868,872 B2 * | 1/2018 | Ikeda ................... C09D 11/328 |
| 2004/0196343 A1 | 10/2004 | Maekawa et al. |
| 2005/0036019 A1 | 2/2005 | Maekawa et al. |
| 2005/0093947 A1 | 5/2005 | Maekawa et al. |
| 2008/0070009 A1 | 3/2008 | Akatani et al. |
| 2009/0113641 A1 | 5/2009 | Akatani et al. |
| 2012/0062646 A1 | 3/2012 | Hasegawa et al. |
| 2015/0017402 A1 | 1/2015 | Suzuki et al. |
| 2015/0275012 A1 | 10/2015 | Ikeda et al. |
| 2015/0337153 A1 | 11/2015 | Oguchi et al. |

(Continued)

FOREIGN PATENT DOCUMENTS

| | | |
|---|---|---|
| CN | 102449082 A | 5/2012 |
| EP | 1 457 534 A1 | 9/2004 |

(Continued)

*Primary Examiner* — Helene Klemanski
(74) *Attorney, Agent, or Firm* — Nutter McClennen & Fish LLP; Alex Nagorniy

(57) ABSTRACT

An ink jet ink composition includes a disperse dye, and a sodium naphthalene sulfonate formalin condensate, in which a ratio of a concentration of sodium ions with respect to a content of the sodium naphthalene sulfonate formalin condensate (Na(ppm)/NSF (% by mass)) is 75 to 550.

6 Claims, 1 Drawing Sheet

(56) References Cited

U.S. PATENT DOCUMENTS

2015/0353752 A1    12/2015  Numakura et al.
2018/0155562 A1*  6/2018  Numakura ............. C09D 11/38

FOREIGN PATENT DOCUMENTS

| EP | 1 533 348 A1 | 5/2005 |
|----|---|---|
| EP | 1 754 760 A1 | 2/2007 |
| JP | 07-051687 B2 | 6/1995 |
| JP | 2003-246954 A | 9/2003 |
| JP | 2004-107647 A | 4/2004 |
| JP | 2005-272518 A | 10/2005 |
| JP | 3972391 B2 | 9/2007 |
| WO | 2013/129523 A1 | 9/2013 |

* cited by examiner

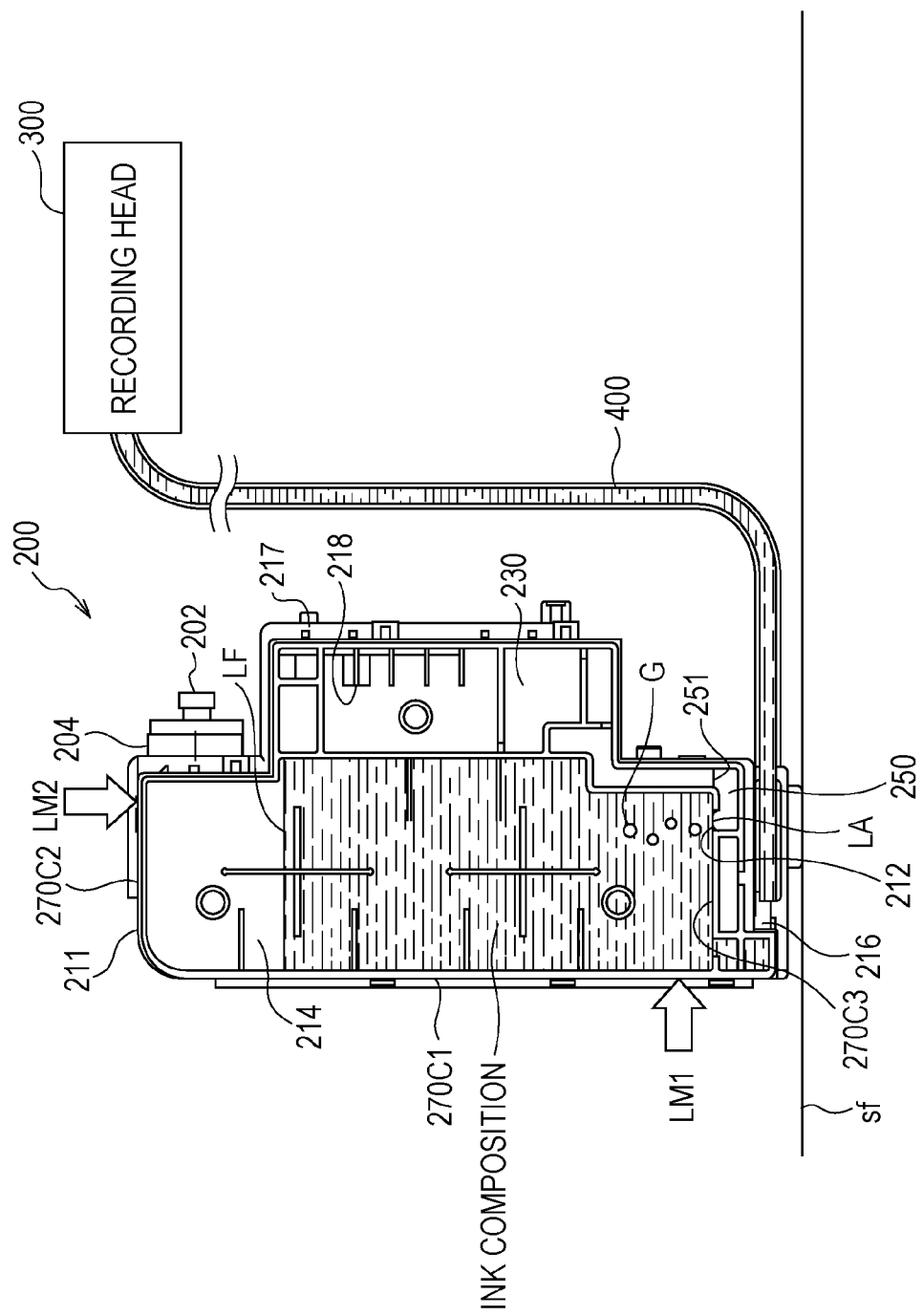

ized. The description of such conventional technology must not be construed as limiting this disclosure.

INK JET INK COMPOSITION AND PRODUCTION METHOD THEREOF

BACKGROUND

1. Technical Field

The present invention relates to an ink jet ink composition and a production method thereof.

2. Related Art

An ink jet recording method makes it possible to record a high resolution image with a relatively simple apparatus and has been rapidly developed in various areas. Among them, various investigations on ink composition storage stability and the like have been conducted. For example, in JP-B-07-51687, in order to provide a recording ink which is consistently kept clean not only in the initial state but also under temperature changes and changes over time without forming impurities by reacting the ink with an eluate from a material in contact with the ink so that the flow of the ink in the ink passage is not changed or disturbed, there is disclosed a recording ink including 0.2% by weight or less of total sodium ions with respect to the total amount of ink.

However, in the case in which the ink composition of the related art is used in a continuous ink supply system provided with an ink containing vessel having an air introduction port, when the content of sodium ions are too low, foreign substances are formed at the gas-liquid interface of the ink composition to cause a problem of nozzle clogging.

In addition, by only simply defining the content of sodium ions, the dispersion stability of a coloring material is not sufficient and eventually, bleeding occurs in an obtained recorded matter. Further, when the dispersion stability of the coloring material is lowered, in a case of using a disperse dye as the coloring material, foreign substances derived from the aggregation of the disperse dye and foreign substances derived from the recrystallization of the disperse dye are formed.

SUMMARY

An advantage of some aspects of the invention is to provide an ink composition capable of suppressing formation of foreign substances derived from the aggregation of a disperse dye and foreign substances derived from the recrystallization of a disperse dye (hereinafter, also referred to as "foreign substances derived from the disperse dye"), and foreign substances at a gas-liquid interface and having bleed resistance, and a production method thereof.

The inventors have conducted an intensive investigation to solve the above problem. As a result, the inventors have found that the above problem can be solved by controlling a ratio between sodium ions and a dispersant and thus have completed the invention.

That is, the invention is as follows.

[1] An ink jet ink composition including a disperse dye, and a sodium naphthalene sulfonate formalin condensate, in which a ratio of a concentration of sodium ions with respect to a content of the sodium naphthalene sulfonate formalin condensate (Na(ppm)/NSF (% by mass)) is 75 to 550.

[2] The ink jet ink composition according to [1] that is prepared by removing cations by a cation exchange membrane.

[3] The ink jet ink composition according to [1] or [2], in which the content of the sodium naphthalene sulfonate formalin condensate is 10 parts by mass to 300 parts by mass with respect to 100 parts by mass of a solid content concentration of the disperse dye.

[4] The ink jet ink composition according to any one of [1] to [3] that is used in an atmosphere opening type recording apparatus.

[5] The ink jet ink composition according to any one of [1] to [4], further including a silicone-based surfactant, in which a content of the silicone-based surfactant is 5.0 parts by mass to 45 parts by mass with respect to 100 parts by mass of the solid content of the disperse dye.

[6] The ink jet ink composition according to [5], further including a moisturizer, a chelating agent, and a pH adjusting agent, in which the ink jet ink composition is prepared by obtaining a dispersion by mixing the silicone-based surfactant with a liquid mixture including the disperse dye and the sodium naphthalene sulfonate formalin condensate, heating the dispersion to 60° C. or higher and cooling the dispersion to 25° C. or lower, and mixing the moisturizer, the chelating agent, and the pH adjusting agent with the dispersion after the heating of the dispersion and filtering the mixture.

[7] A production method of an ink jet ink composition including obtaining a dispersion by mixing a silicone-based surfactant with a liquid mixture including a disperse dye and a sodium naphthalene sulfonate formalin condensate, heating the dispersion to 60° C. or higher and cooling the dispersion to 25° C. or lower, and mixing a moisturizer, a chelating agent, and a pH adjusting agent with the dispersion after the heating of the dispersion and filtering the mixture.

BRIEF DESCRIPTION OF THE DRAWING

The invention will be described with reference to the accompanying drawing, wherein like numbers reference like elements.

The FIGURE is a schematic view showing a cross section of an example of an ink containing vessel.

DESCRIPTION OF EXEMPLARY EMBODIMENTS

Hereinafter, an embodiment for implementing the invention (hereinafter, also referred to as an "embodiment") will be described in detail. However, the invention is not limited to the embodiment and various modifications can be made within the range not departing from the gist of the invention.

Ink Jet Ink Composition

An ink jet ink composition according to an embodiment (hereinafter, also referred to as an "ink composition") includes a disperse dye and a sodium naphthalene sulfonate formalin condensate which is a dispersant, and a ratio of the concentration of sodium ions with respect to the content of the sodium naphthalene sulfonate formalin condensate (Na (ppm)/NSF (% by mass)) is 75 to 550.

When the ink composition containing the disperse dye is stored in the environment in which a storage environment such as a storage temperature is changed and the ink composition is easily dried as in an atmosphere opening type, particularly, foreign substances derived from aggregation or recrystallization of the disperse dye are easily formed. In addition, foreign substances formed by deterioration of the solubility of the dispersant and foreign substances derived from the film formation of a surfactant contained in the ink composition as necessary are easily formed. When such foreign substances are formed in the ink composition, nozzle clogging is induced. Further, at the time of preparation of a recorded matter, when the dispersion stability of the disperse dye is uneven among respective color ink compositions, a problem arises in that bleeding easily occurs in a recorded matter.

Contrarily, in the ink composition according to the embodiment, the dispersion stability of the disperse dye by the dispersant can be maintained at a high level by adjusting the relationship between the content of the sodium naphthalene sulfonate formalin condensate and the concentration of sodium ions even when the storage environment is changed or the composition of the ink composition is changed such that the ink composition is dried by storage. Therefore, it is possible to suppress formation of respective foreign substances and thus excellent bleed resistance is obtained.

Disperse Dye

As the disperse dye, the following can be used.

A yellow disperse dye is not particularly limited and examples thereof include C.I. Disperse Yellow 3, 4, 5, 7, 9, 13, 23, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 108, 114, 116, 118, 119, 122, 124, 126, 135, 140, 141, 149, 160, 162, 163, 164, 165, 179, 180, 182, 183, 184, 186, 192, 198, 199, 202, 204, 210, 211, 215, 216, 218, 224, 227, 231, and 232.

An orange disperse dye is not particularly limited and examples thereof include C.I. Disperse Orange 1, 3, 5, 7, 11, 13, 17, 20, 21, 25, 29, 30, 31, 32, 33, 37, 38, 42, 43, 44, 45, 46, 47, 48, 49, 50, 53, 54, 55, 56, 57, 58, 59, 61, 66, 71, 73, 76, 78, 80, 89, 90, 91, 93, 96, 97, 119, 127, 130, 139, and 142.

A red disperse dye is not particularly limited and examples thereof include C.I. Disperse Red 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 298, 302, 303, 310, 311, 312, 320, 324, and 328.

A violet disperse dye is not particularly limited and examples thereof include C.I. Disperse Violet 1, 4, 8, 23, 26, 27, 28, 31, 33, 35, 36, 38, 40, 43, 46, 48, 50, 51, 52, 56, 57, 59, 61, 63, 69, and 77.

A green disperse dye is not particularly limited and examples thereof include C.I. Disperse Green 9.

A brown disperse dye is not particularly limited and examples thereof include C.I. Disperse Brown 1, 2, 4, 9, 13, and 19.

A blue disperse dye is not particularly limited and examples thereof include C.I. Disperse Blue 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 267, 268, 270, 284, 285, 287, 288, 291, 293, 295, 297, 301, 315, 330, and 333.

A black disperse dye is not particularly limited and examples thereof include C.I. Disperse Black 1, 3, 10, and 24.

The content of the disperse dye is preferably 1.0 part by mass to 10 parts by mass, more preferably 1.0 part by mass to 7.5 parts by mass, and still more preferably 2.5 parts by mass to 7.5 parts by mass with respect to the total 100 parts by mass of the ink composition. When the content of the disperse dye is 1.0 parts by mass or more, the color development tends to be further improved. In addition, when the content of the disperse dye is 10 parts by mass or less, foreign substances derived from the disperse dye and foreign substances at the gas-liquid interface tend to be less formed.

Dispersant

The ink composition of the embodiment includes the sodium naphthalene sulfonate formalin condensate as a dispersant and thus formation of foreign substances at a gas-liquid interface can be suppressed.

The sodium naphthalene sulfonate formalin condensate is not particularly limited and examples thereof include sodium alkyl naphthalene sulfonates such as sodium creosote oil sulfonate, sodium cresol sulfonate, sodium phenol sulfonate, β-sodium naphthol sulfonate, sodium methyl naphthalene sulfonate, and sodium butyl naphthalene sulfonate, a mixture of β-sodium naphthalene sulfonate and β-sodium naphthol sulfonate, a mixture of sodium cresol sulfonate and 2-naphtol-6-sodium sulfonate, and a condensate of sodium naphthalene sulfonate such as lignin sulfonic acid and formalin. The sodium naphthalene sulfonate formalin condensates may be used alone or in combination of two or more thereof.

The content of the sodium naphthalene sulfonate formalin condensate is preferably 0.10 parts by mass to 17.5 parts by mass, more preferably 0.50 parts by mass to 15 parts by mass, and still more preferably 1.0 part by mass to 12.5 parts by mass with respect to the total 100 parts by mass of the ink composition. When the content of the dispersant is 0.10 parts by mass or more, formation of foreign substances derived from the disperse dye and foreign substances at the gas-liquid interface tends to be further suppressed. In addition, when the content of the dispersant is 17.5 parts by mass or less, the bleed resistance tends to be further improved.

Further, the content of the sodium naphthalene sulfonate formalin condensate is preferably 10 parts by mass to 300 parts by mass, more preferably 30 parts by mass to 200 parts by mass, and still more preferably 50 parts by mass to 150 parts by mass with respect to 100 parts by mass of the solid content concentration of the disperse dye. When the content of the sodium naphthalene sulfonate formalin condensate is 10 parts by mass or more, the bleed resistance tends to be further improved. In addition, when the content of the sodium naphthalene sulfonate formalin condensate is 300 parts by mass or less, formation of foreign substances derived from the disperse dye tends to be suppressed.

The ink composition of the embodiment may include other dispersants. Other dispersants are not particularly limited and examples thereof include a nonionic dispersant and a polymer dispersant.

The nonionic dispersant is not particularly limited and examples thereof include an ethylene oxide adduct of phytosterol and an ethylene oxide adduct of cholestanol.

Sodium Ion

The content of sodium ions in the ink composition is preferably 350 ppm to 2500 ppm and more preferably 500 ppm to 2000 ppm with respect to the total 100% by mass of the ink composition. When the content of sodium ions is 350 ppm or more, foreign substances tend to be less formed at the gas-liquid interface. In addition, when the content of sodium ions is 2500 ppm or less, formation of foreign substances derived from the disperse dye tends to be further suppressed. The content of sodium ions can be measured by a method described in the examples. Further, the content of sodium ions can be controlled by a cation removing process, which will be described later.

A ratio A of the concentration of sodium ions with respect to the content of the sodium naphthalene sulfonate formalin condensate (Na(ppm)/NSF (% by mass)) is 75 to 550, preferably 75 to 500, and more preferably 100 to 400. When the ratio A is 75 or more, the solubility of the dispersant (sodium naphthalene sulfonate formalin condensate) is further improved and a free dispersant not present around the disperse dye can be further prevented from becoming foreign substances at the gas-liquid interface. In addition, when the ratio A is 75 or more, the dispersibility of the disperse dye by the dispersant (sodium naphthalene sulfonate formalin condensate) is further improved and the bleed resistance is further improved. Further, when the ratio A is 550 or less, the solubility of the dispersant (sodium naphthalene sulfonate formalin condensate) is not excessively improved and the amount of the dispersant contributing to improvement in dispersibility of the disperse dye is further increased and thus it is possible to further suppress formation of foreign substances derived from the disperse dye.

A ratio B of the concentration of sodium ions with respect to the content of the disperse dye (Na(ppm)/disperse dye (% by mass)) is preferably 75 to 550, more preferably 75 to 500, and still more preferably 100 to 400. When the ratio B is 75 or more, foreign substances tend to be less formed at the gas-liquid interface. When the ratio B is 550 or less, formation of foreign substances derived from the disperse dye tends to be further suppressed.

Surfactant

It is preferable that the ink composition includes a surfactant. The surfactant is not particularly limited and examples thereof include a silicone-based surfactant, a fluorine-based surfactant, and an acetylene glycol-based surfactant.

Among these, a silicone-based surfactant is preferable and a polyether modified polydimethylsiloxane-based surfactant is more preferable. When such a surfactant is used, formation of foreign substances derived from the surfactant at the gas-liquid interface tends to be further suppressed.

A commercially available product of the silicone-based surfactant is not particularly limited and specific examples thereof include BYK-306, BYK-307, BYK-333, BYK-341, BYK-345, BYK-346, BYK-347, BYK-348, and BYK-349 (all trade names, manufactured by BYK Japan KK), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all trade names, manufactured by Shin-Etsu Chemicals Co., Ltd.). These silicone-based surfactants may be used alone or in combination of two or more.

The acetylene glycol-based surfactant is not particularly limited and at least one selected from 2,4,7,9-tetramethyl-5-decyne-4,7-diol, and an alkylene oxide adduct of 2,4,7,9-tetramethyl-5-decyne-4,7-diol, and 2,4-dimethyl-5-decyne-4-ol, and an alkylene oxide adduct of 2,4-dimethyl-5-decyne-4-ol is preferably used. A commercially available product of the acetylene glycol-based surfactant is not particularly limited and examples thereof include Olfine 104 series, PD series such as Olfine PD002W and E series such as Olfine E1010 (trade names, manufactured by Air Products Japan, Inc.), and Surfynol 465 and Surfynol 61 (trade names, manufactured by Nissin Chemical Industry CO., Ltd.). These acetylene glycol-based surfactants may be used alone or in combination of two or more thereof.

The fluorine-based surfactant is not particularly limited and examples thereof include perfluoroalkylsulfonate, perfluoroalkylcarboxylate, perfluoroalkyl phosphoric acid ester, a perfluoroalkyl ethylene oxide adduct, perfluoroalkyl betaine, and a perfluoroalkyl amine oxide compound. A commercially available product of the fluorine-based surfactant is not particularly limited and the examples thereof include S-144, S-145 (manufactured by ASAHI GLASS CO., LTD.); FC-170C, FC-430, and Fluorad-FC4430 (manufactured by Sumitomo 3M Limited); FSO, FSO-100, FSN, FSN-100, and FS-300 (manufactured by DuPont); and FT-250 and 251 (manufactured by NEOS COMPANY LIMITED). The fluorine-based surfactants may be used alone or in combination of two or more thereof.

The content of the silicone-based surfactant is preferably 5.0 parts by mass to 45 parts by mass, more preferably 8.0 parts by mass to 40 parts by mass, and still more preferably 10 parts by mass to 36 parts by mass with respect to 100 parts by mass of the solid content of the disperse dye. When the content of the silicone-based surfactant is 5.0 parts by mass or more, formation of foreign substances derived from the disperse dye can be suppressed and thus foreign substances at the gas-liquid interface tend to be less formed. In addition, when the content of the silicone-based surfactant is 45 parts by mass or less, the bleed resistance tends to be further improved.

Moisturizer

The ink composition may further contain a moisturizer. When the ink composition contains a moisturizer, in an atmosphere opening type continuous ink supply system or the like, even when the ink composition is stored while being in contact with the air, formation of foreign substances derived from the disperse dye and formation of foreign substances at the gas-liquid interface tend to be further suppressed.

The moisturizer is not particularly limited and examples thereof include ethylene glycol, propylene glycol, diethylene glycol, triethylene glycol, pentamethylene glycol, trimethylene glycol, 2-butene-1,4-diol, 2-ethyl-1,3-hexandiol, 2-methyl-2,4-pentanediol, tripropylene glycol, polyethylene glycol having a number average molecular weight of 2000 or less, 1,3-propylene glycol, isopropylene glycol, isobutylene glycerol, glycerol, meso-erythritol, and penta-erythritol. The moisturizers may be used alone or in combination of two or more thereof.

Chelating Agent

The ink composition may further contain a chelating agent. The chelating agent is not particularly limited and examples thereof include ethylenediamine tetraacetate, edetate disodium salt, pyrophosphate, hexametaphosphate, citric acid, tartaric acid, and gluconic acid. These chelating agents may be used alone or in combination of two or more thereof.

pH Adjusting Agent

The ink composition may further contain a pH adjusting agent. The pH adjusting agent is not particularly limited and examples thereof include inorganic acids (for example, sulfuric acid, hydrochloric acid, and nitric acid) inorganic bases (for example, lithium hydroxide, sodium hydroxide, potassium hydroxide, and ammonia), organic bases (for example, triethanolamine, diethanolamine, monoethanolamine, and tripropanolamine), and organic acids (for example, adipic acid, citric acid, and succinic acid). These pH adjusting agents may be used alone or in combination of two or more thereof.

Preservative

The ink composition may further contain a preservative. The preservative is not particularly limited and examples thereof include p-hydroxybenzoic esters (methylparaben, methylparaben sodium, ethylparaben, benzylparaben, butylparaben, isobutylparaben, propylparaben, and isopropylparaben), chlorobutanol, benzyl alcohol, 2-phenylethyl alcohol, dehydroacetic acid, sorbic acid, and sodium benzoate. These preservatives may be used alone or in combination of two or more thereof.

Other Additives

The ink composition may further contain various additives that are commonly used for ink, as necessary, in addition to an antifungal agent, an antioxidant, an ultraviolet absorber, an oxygen absorber, or a dissolution aid. The various additives may be used alone or in combination of two or more thereof.

Atmosphere Opening Type Recording Apparatus Use

The ink composition of the embodiment is preferably used in an atmosphere opening type recording apparatus. The "atmosphere opening type recording apparatus" refers to a recording apparatus including an ink containing vessel having a structure in which the ink composition is in contact with the atmosphere. Further, the atmosphere opening type recording apparatus is an opening type (typically in contact with fresh air) such that the ink composition can be replenished in a liquid state and is distinguished from a recording apparatus which has a structure in which the ink composition cannot be replenished like the ink cartridge of the related art (completely closed type or having an air layer but volumetrically very small and no direct air introduction). In the atmosphere opening type recording apparatus, the ink composition is in contact with the atmosphere and thus foreign substances are easily formed particularly at the gas-liquid interface due to drying of the ink or the like. Therefore, the invention is particularly useful. The atmosphere opening type recording apparatus is not particularly limited and examples thereof include a recording apparatus including a continuous ink supply system.

The "continuous ink supply system" includes an ink containing vessel (ink tank) having an air introduction port, a recording head having nozzles that discharge the ink composition into the ink containing vessel, and an ink supply path that connects the ink containing vessel and the recording head and supplies the ink composition from the ink containing vessel to the recording head.

The ink containing vessel included in the atmosphere opening type recording apparatus will be described below. The FIGURE is a schematic view showing a cross section of an ink containing vessel 200. The ink containing vessel 200 is connected to a recording head 300 by an ink supply path 400.

The ink containing vessel 200 includes an ink containing chamber 214 having an air introduction port 212 and by introducing air into the ink composition contained in the ink containing chamber 214 from the air introduction port 212, bubbles are generated in the ink composition. In addition, in the ink containing vessel 200, the air is in contact with the ink composition. By introducing the air into the ink composition from the air introduction port 212, in a state in which the ink is contained in the ink containing chamber 214 so that bubbles are generated in the ink composition, the ink composition may be in contact with the air introduction port 212.

Although not shown in the drawing, the recording apparatus may have plural ink containing vessels 200. Further, the ink supply path 400 can be formed with a member having flexibility, such as synthetic rubber, and can be formed into a hose or a tube.

A technique of supplying the ink composition shown in the FIGURE is one utilizing the principle of the Mariotte's bottle when briefly described and is one in which the recording head 300 and the ink containing vessel 200 are connected through the ink supply path 400 and the ink composition is sucked from the ink containing vessel 200 and supplied to the recording head 300.

In the FIGURE, the ink containing vessel 200 is mounted on the recording apparatus in a use state. The recording apparatus is arranged on a horizontal surface sf. The expression of "when the ink jet recording apparatus is being used" refers to a state in which the ink composition is discharged to a medium and normally adheres to the medium, and the recording apparatus is not necessarily arranged on the horizontal surface. An ink outlet port 216 of the ink containing vessel 200 and the recording head 300 are connected through the ink supply path 400.

The outer surface of the ink containing vessel 200 includes a first wall 270C1, a second wall (upper wall) 270C2, and a bottom wall 270C3. The ink containing vessel 200 has an air introduction flow path and an ink flow path therein. The air introduction flow path is a path for introducing the air from an atmosphere opening port 217 to the ink containing chamber 214 through an atmosphere flow path (not shown) and an atmosphere introduction port 218. An ink flow path ink pouring port 204 is an opening having an opening/closing mechanism for refilling the ink containing chamber 214 with the ink composition from the ink flow path ink pouring port 204.

The air introduction flow path is a flow path used in the above-described air introduction operation. The air introduction flow path is configured to have an atmosphere opening port 217 opened toward the outside (atmosphere), an air containing chamber 230 in which the atmosphere introduction port 218 serves as one end and an air chamber side opening 251 serves as the other end, and an ink chamber communication path 250 in which the air chamber side opening 251 serves as one end and the air introduction port 212 serves as the other end. The atmosphere opening port 217 communicates with the atmosphere, the air containing chamber 230 is opened in the atmosphere introduction port 218 serving as one end, and the atmosphere opening port 217 and the atmosphere introduction port 218 communicate with each other through a flow path (not shown). That is, the air containing chamber 230 communicates with the outside (atmosphere). In the ink chamber communication path 250, the air chamber side opening 251 serving as one end is opened in the air containing chamber 230 and the air introduction port 212 serving as the other end is opened in the ink containing chamber 214. That is, the air containing chamber 230 communicates with the ink containing chamber 214. The flow path cross-sectional area of the ink chamber communication path 250 is preferably small such that a meniscus (liquid surface crosslinking) can be formed.

Thus, in the air introduction flow path described above, the air introduction port 212 serving as one end is opened in the ink containing chamber 214 and the atmosphere opening port 217 serving as the other end is opened to the outside. That is, in the use state of the ink containing vessel 200, a liquid surface directly contacting the atmosphere is formed in the ink chamber communication path 250 (specifically, near the air introduction port 212) and by introducing the air (bubbles) into the ink in the ink containing vessel 214 from the air introduction port 212, air (bubbles G) is introduced into the ink containing chamber 214. Thus, the ink composition can be stably supplied from the ink containing vessel 200 to the recording head 300.

These ink supply operations are performed with a reduction in the ink storage amount of the ink containing vessel 200 resulting from the discharge operation from the recording head 300 and are stably performed by the air introduction operation.

The ink containing vessel 200 has a use state and a pouring state. The "use state" refers to a state of the ink containing vessel 200 when the ink jet recording apparatus is being used. In the use state, the ink pouring port 204 of the ink containing vessel 200 is opened in a horizontal direction (here, the opening is closed by a plug member 202). The FIGURE shows the ink containing vessel 200 in the use state. In the use state, the ink containing chamber 214 and the air containing chamber 230 are horizontally positioned in a line. Further, in the use state, the air introduction port 212 is positioned below the liquid surface of the ink composition contained in the ink containing chamber 214.

On the other hand, the "pouring state" of the ink containing vessel 200 refers to a state in which the ink pouring port 204 is arranged so as to be opened upward. In the pouring state, the ink containing chamber 214 and the air containing chamber 230 are positioned in a line in a perpendicular direction. Further, in the pouring state, the air introduction port 212 is positioned above the liquid surface of the ink composition contained in the ink containing chamber 214 in a case where the liquid with a liquid amount when the liquid surface of the ink composition contained in the ink containing chamber 214 in the use state is located on a straight line LM1 ("first state display line LM1" (refer to the FIGURE)) is contained in the ink containing chamber 214.

In the pouring state of the ink containing vessel 200, a user may stop the refilling with the ink when the liquid surface of the ink composition reaches near a straight line LM2 ("second state display line LM2" (refer to the FIGURE)) which becomes horizontal in the pouring state. Thus, after the ink composition is poured into the ink containing chamber 214 from the ink pouring port 204, the ink pouring port 204 is sealed by the plug member 202. Furthermore, the ink containing chamber 214 is maintained at a negative pressure by sucking the ink in the ink containing chamber 214 from the recording head 300.

In the use state of the ink containing vessel 200, the air introduction port 212 is positioned below the first state display line LM1. In the FIGURE, the air introduction port 212 is formed on the bottom wall 270C3 positioned at a lower side with the ink containing chamber 214 interposed therebetween in the use state of a container main body 211 which defines and forms the ink containing chamber 214. Thus, even when the ink in the ink containing chamber 214 is consumed and the liquid surface of the ink composition in the ink containing chamber 214 is lowered, a liquid surface (atmosphere contact surface) LA contacting the atmosphere is maintained at a fixed height over a long period of time (time in which the liquid surface of the ink composition reaches the first state display line LM1). In the use state, the air introduction port 212 is arranged to be lower than the position of the nozzle holes (not shown) of the recording head 300 in a perpendicular direction.

When the ink composition is sucked by the recording head 300, a negative pressure is generated. When the pressure becomes a predetermined negative pressure, the ink composition in the ink containing chamber 214 is supplied to the recording head 300 through the ink supply path 400.

When the ink in the ink containing chamber 214 is consumed, the air in the air containing chamber 230 is introduced into the ink containing chamber 214 through the ink chamber communication path 250 as bubbles G. Thus, the ink liquid surface LF in the ink containing chamber 214 is lowered. On the other hand, the height of the atmosphere contact liquid surface LA contacting the atmosphere is maintained at a fixed height.

Production Method of Ink Jet Ink Composition

A production method of the ink jet ink composition of the embodiment includes a dispersion process of obtaining a dispersion by mixing a silicone-based surfactant with a liquid mixture including a disperse dye and a sodium naphthalene sulfonate formalin condensate, a heating process of heating the dispersion to 60° C. or higher and cooling the dispersion to 25° C. or lower, and a finishing process of mixing a moisturizer, a chelating agent, and a pH adjusting agent with the dispersion after the heating of the dispersion and filtering the mixture.

The heating temperature in the heating process is preferably 40° C. or higher and more preferably 60° C. or higher. When the heating temperature in the heating process is 60° C. or higher, the dispersion stability of the disperse dye and the dispersant tends to be further improved.

The cooling temperature in the heating process is preferably 30° C. or lower and more preferably 25° C. or lower. When the cooling temperature in the heating process is 25° C. or lower, the long-term dispersion stability tends to be further improved.

The ink composition of the embodiment is preferably an ink composition that further includes the moisturizer, the chelating agent, and the pH adjusting agent, and is produced by the above-described production method. Through the above-described dispersion process and heating process, the dispersion stability of the disperse dye is further improved and even when the ink composition is left in a dry state or high temperature state, formation of foreign substances can be suppressed and thus formation of foreign substances derived from the disperse dye can be further suppressed. In addition, the dispersion stability of the disperse dye is improved and thus the bleed resistance tends to be further improved.

The production method of the ink jet ink composition of the embodiment preferably has a cation removing process of removing cations by a cation exchange membrane. In other words, the ink jet composition of the embodiment is preferably an ink composition prepared through the cation removing process of removing cations by a cation exchange membrane. The cation removing process may be a process of removing cations (for example sodium ions) from the dispersion as described above after the dispersion process, a process of removing cations from the dispersion as described above after the heating process, or a process of removing cations from the dispersion as described above after the finishing process.

The finishing process is a process of mixing the moisturizer, the chelating agent, and the pH adjusting agent with the dispersion after the heating process and filtering the mixture. The filtration can be performed by allowing the ink composition to pass through a filter. Thus, foreign substances can be removed.

EXAMPLES

Hereinafter, the invention will be described in more detail using Examples and Comparative Examples. The invention is not limited to the following examples.

Materials for Ink Composition

Main materials for the ink composition used in each of the following Examples and Comparative Examples are as follows.

Disperse Dye
  C.I. Disperse Red 60
Dispersant
  Sodium naphthalene sulfonate formalin condensate
  Styrene-acrylic acid copolymer
Surfactant
  BYK 348 (silicone-based surfactant, manufactured by BYK Japan KK)
  Olfine PD002W (acetylene glycol-based surfactant, manufactured by Nissin Chemical Industry Co., Ltd.)
Moisturizer
  Glycerol
  Triethylene glycol
pH Adjusting Agent
  Triethanolamine
Chelating Agent
  EDTA.2Na
Preservative
  Proxel GXL (manufactured by Arch Chemicals Inc.)

Examples 1 to 13 and Comparative Examples 1 to 4

Preparation of Ink Composition

A surfactant was mixed with a liquid mixture including a disperse dye, a sodium naphthalene sulfonate formalin condensate, and water and thus a dispersion was prepared. Then, each ink composition was subjected to a cation removing process. The obtained dispersion was heated to 60° C. and cooled to 25° C. Next, a moisturizer, a chelating agent, and a pH adjusting agent were mixed with the obtained dispersion, and the mixture was filtered to obtain each ink composition. However, in Example 13, the above-described heating and cooling were not carried out. In the following Table 1, the unit of the numerical value is % by mass and the total is 100.0% by mass.

Measurement of Content of Sodium Ion

The content of sodium ions was measured using a sample obtained by diluting the ink composition with water with the following apparatus.
  ICP emission spectrometer (ICP-AES) type: ICPS-7500
  Maker: SHIMADZU CORPORATION
  Sequential type
  Wavelength range: 160 nm to 850 nm
  Frequency: 27.120 MH Test for Confirming Foreign Substances in Ink Composition The ink composition obtained in the above described manner (10 mL) was poured into an ink pack and hermetically sealed so that an air layer was not formed. Then, the ink composition was left at 60° C. for 5 days. Then, the ink composition was filtered using a metal mesh filter (having a pore diameter of 10 μm) and the number of foreign substances remaining on the metal mesh filter in an area of 1 mm square was counted. Based on the obtained number, formation of foreign substances in the ink composition was evaluated according to the following criteria.

Evaluation Criteria
  A: The number of crystal foreign substances in an area of 1 mm square was less than 5.
  B: The number of crystal foreign substances in an area of 1 mm square was 5 or more and less than 30.
  C: The number of crystal foreign substances in an area of 1 mm square was 30 or more and less than 50.
  D: The number of crystal foreign substances in an area of 1 mm square was 50 or more.

Test for Confirming Foreign Substances at Gas-Liquid Interface of Ink Composition The ink composition obtained in the above described manner (10 mL) was left at 60° C. for 5 days in a state in which the gas-liquid interface was present in a glass bottle. Thereafter, the ink composition was filtered using a metal mesh filter (having a pore diameter of 10 μm) and the number of foreign substances remaining on the metal mesh filter in an area of 1 mm square was counted. Based on the obtained number, formation of foreign substances at the gas-liquid interface of the ink composition was evaluated according to the following criteria.

Evaluation Criteria
  A: The number of crystal foreign substances in an area of 1 mm square was less than 5.
  B: The number of crystal foreign substances in an area of 1 mm square was 5 or more and less than 30.
  C: The number of crystal foreign substances in an area of 1 mm square was 30 or more and less than 50.
  D: The number of crystal foreign substances in an area of 1 mm square was 50 or more.

Bleed Resistance

Using an ink jet type recording apparatus (manufactured by Seiko Epson Corporation) having a continuous ink supply system, recording was performed on a recording medium with a Duty of 100% using the ink composition. Recording was performed with a Duty of 100% using the yellow ink composition in which the composition was adjusted as in Example 1 except that Disperse Yellow 54 was used as a coloring material so as to be in direct contact with the recording region and thus a recorded matter in direct contact with a two-color recording region was obtained. The boundary of the colors in the recording region was visually observed. Based on the degree of bleeding after recording (amount of color bleeding), the bleed resistance was evaluated according to the following evaluation criteria.

Evaluation Criteria
  A: The amount of color bleeding was less than 0.1 cm.
  B: The amount of color bleeding was 0.1 cm or more and less than 0.2 cm.
  C: The amount of color bleeding was 0.2 cm or more and less than 0.3 cm.
  D: The amount of color bleeding was 0.3 cm or more.

TABLE 1

| | | | \multicolumn{9}{c}{Example} |
| | | | 1 | 2 | 3 | 4 | 5 | 6 | 7 | 8 | 9 |
|---|---|---|---|---|---|---|---|---|---|---|---|
| Dispersion process | Disperse dye | Disperse Red 60 | 5 | 5 | 5 | 5 | 5 | 5 | 5 | 5 | 5 |
| | Dispersant | NSF*[1] | 5 | 5 | 5 | 5 | 5 | 5 | 5 | 7 | 2.5 |
| | | Styrene-acrylic acid copolymer | — | — | — | — | — | — | — | — | — |

TABLE 1-continued

|  |  |  |  |  |  |  |  |  |  |  |  |
|---|---|---|---|---|---|---|---|---|---|---|---|
|  |  | Water | 23 | 23 | 23 | 23 | 23 | 23 | 23 | 23 | 23 |
|  | Surfactant | BYK348 | 0.8 | 0.8 | 0.8 | 0.5 | 1.8 | 0.4 | 2 | 0.8 | 0.8 |
|  |  | Olefine PD002W | — | — | — | — | — | — | — | — | — |
| Finishing process | Moisturizer | Glycerol | 20 | 20 | 20 | 20 | 20 | 20 | 20 | 20 | 20 |
|  |  | Triethylene glycol | 10 | 10 | 10 | 10 | 10 | 10 | 10 | 10 | 10 |
|  | pH Adjusting agent | Triethanolamine | 0.5 | 0.5 | 0.5 | 0.5 | 0.5 | 0.5 | 0.5 | 0.5 | 0.5 |
|  | Chelating Agent | EDTA·2Na | 0.01 | 0.01 | 0.01 | 0.01 | 0.01 | 0.01 | 0.01 | 0.01 | 0.01 |
|  | Preservative | Proxel GXL | 0.3 | 0.3 | 0.3 | 0.3 | 0.3 | 0.3 | 0.3 | 0.3 | 0.3 |
|  |  | Pure water | Remainder | Remainder | Remainder | Remainder | Remainder | Remainder | Remainder | Remainder | Remainder |
| Ratio of each component | Na (ppm)/disperse dye (% by mass) |  | 200 | 100 | 400 | 200 | 200 | 200 | 200 | 200 | 200 |
|  | Na (ppm)/NSF[*1] (% by mass) |  | 200 | 100 | 400 | 200 | 200 | 200 | 200 | 143 | 400 |
|  | Content[*2] of NSF[*1] |  | 100 | 100 | 100 | 100 | 100 | 100 | 100 | 140 | 50 |
|  | Content[*3] of silicone-based surfactant |  | 16 | 16 | 16 | 10 | 36 | 8 | 40 | 16 | 16 |
|  | Content of sodium ions (ppm) |  | 1000 | 500 | 2000 | 1000 | 1000 | 1000 | 1000 | 1000 | 1000 |
| Evaluation result | Test for confirming foreign substances in ink composition |  | A | A | B | A | B | A | C | A | B |
|  | Bleed resistance |  | A | A | A | B | A | C | A | B | A |
|  | Test for confirming foreign substances at gas-liquid interface of ink composition |  | A | B | A | A | A | A | A | A | A |

|  |  |  | Example |  |  |  | Comparative Example |  |  |  |
|---|---|---|---|---|---|---|---|---|---|---|
|  |  |  | 10 | 11 | 12 | 13 | 1 | 2 | 3 | 4 |
| Dispersion process | Disperse dye | Disperse Red 60 | 5 | 5 | 5 | 5 | 5 | 5 | 5 | 5 |
|  | Dispersant | NSF[*1] | 7.5 | 1.85 | 10 | 5 | 5 | 5 | — | 5 |
|  |  | Styrene-acrylic acid copolymer | — | — | — | — | — | — | 5 | — |
|  |  | Water | 23 | 23 | 23 | 23 | 23 | 23 | 23 | 23 |
|  | Surfactant | BYK348 | 0.8 | 0.8 | 0.8 | 0.8 | 0.8 | 0.8 | 0.8 | — |
|  |  | Olefine PD002W | — | — | — | — | — | — | — | 0.8 |
| Finishing process | Moisturizer | Glycerol | 20 | 20 | 20 | 20 | 20 | 20 | 20 | 20 |
|  |  | Triethylene glycol | 10 | 10 | 10 | 10 | 10 | 10 | 10 | 10 |
|  | pH Adjusting agent | Triethanolamine | 0.5 | 0.5 | 0.5 | 0.5 | 0.5 | 0.5 | 0.5 | 0.5 |
|  | Chelating Agent | EDTA·2Na | 0.01 | 0.01 | 0.01 | 0.01 | 0.01 | 0.01 | 0.01 | 0.01 |
|  | Preservative | Proxel GXL | 0.3 | 0.3 | 0.3 | 0.3 | 0.3 | 0.3 | 0.3 | 0.3 |
|  |  | Pure water | Remainder | Remainder | Remainder | Remainder | Remainder | Remainder | Remainder | Remainder |
| Ratio of each component | Na (ppm)/disperse dye (% by mass) |  | 200 | 200 | 200 | 200 | 50 | 600 | 400 | 400 |
|  | Na (ppm)/NSF[*1] (% by mass) |  | 133 | 541 | 100 | 200 | 50 | 600 | — | 400 |
|  | Content[*2] of NSF[*1] |  | 150 | 30 | 200 | 100 | 100 | 100 | — | 100 |
|  | Content[*3] of silicone-based surfactant |  | 16 | 16 | 16 | 16 | 16 | 16 | 16 | — |
|  | Content of sodium ions (ppm) |  | 1000 | 1000 | 1000 | 1000 | 250 | 3000 | 2000 | 2000 |
| Evaluation result | Test for confirming foreign substances in ink composition |  | A | C | A | B | B | D | A | D |
|  | Bleed resistance |  | B | B | C | B | A | B | A | B |
|  | Test for confirming foreign substances at gas-liquid interface of ink composition |  | A | C | B | A | D | A | D | B |

[*1]NSF: sodium naphthalene sulfonate formalin condensate
[*2]Content of sodium naphthalene sulfonate formalin condensate with respect to 100 parts by mass of solid content of disperse dye
[*3]Content of silicone-based surfactant with respect to 100 parts by mass of solid content of disperse dye The entire disclosure of Japanese Patent Application No. 2014-071238, filed Mar. 31, 2014 is expressly incorporated by reference herein.

What is claimed is:

1. An ink jet ink composition comprising:
   a disperse dye; and
   a sodium naphthalene sulfonate formalin condensate,
   wherein a ratio of a concentration of sodium ions with respect to a content of the sodium naphthalene sulfonate formalin condensate (Na(ppm)/NSF (% by mass)) is 75 to 550, and
   wherein the ink jet composition is prepared by removing cations by a cation exchange membrane.

2. The ink jet ink composition according to claim 1, wherein the content of the sodium naphthalene sulfonate formalin condensate is 10 parts by mass to 300 parts by mass with respect to 100 parts by mass of a solid content concentration of the disperse dye.

3. The ink jet ink composition according to claim 1 that is used in an atmosphere opening type recording apparatus.

4. The ink jet ink composition according to claim 1, further comprising
   a silicone-based surfactant,
   wherein a content of the silicone-based surfactant is 5.0 parts by mass to 45 parts by mass with respect to 100 parts by mass of the solid content of the disperse dye.

5. The ink jet ink composition according to claim 4, further comprising:
   a moisturizer;
   a chelating agent; and
   a pH adjusting agent,
   wherein the ink jet ink composition is prepared by obtaining a dispersion by mixing the silicone-based surfactant with a liquid mixture including the disperse dye and the sodium naphthalene sulfonate formalin condensate, heating the dispersion to 60° C. or higher and cooling the dispersion to 25° C. or lower, and mixing the moisturizer, the chelating agent, and the pH adjusting agent with the dispersion after the heating of the dispersion and filtering the mixture.

6. A production method of an ink jet ink composition comprising:
   obtaining a dispersion by mixing a silicone-based surfactant with a liquid mixture including a disperse dye and a sodium naphthalene sulfonate formalin condensate;
   heating the dispersion to 60° C. or higher and cooling the dispersion to 25° C. or lower; and
   mixing a moisturizer, a chelating agent, and a pH adjusting agent with the dispersion after the heating of the dispersion and filtering the mixture, and
   wherein the ink jet composition is prepared by removing cations by a cation exchange membrane.

* * * * *